June 24, 1952  T. H. MILBOURN  2,601,412
MACHINE FOR HARVESTING POTATOES AND OTHER ROOT CROPS
Filed July 16, 1949  4 Sheets-Sheet 3

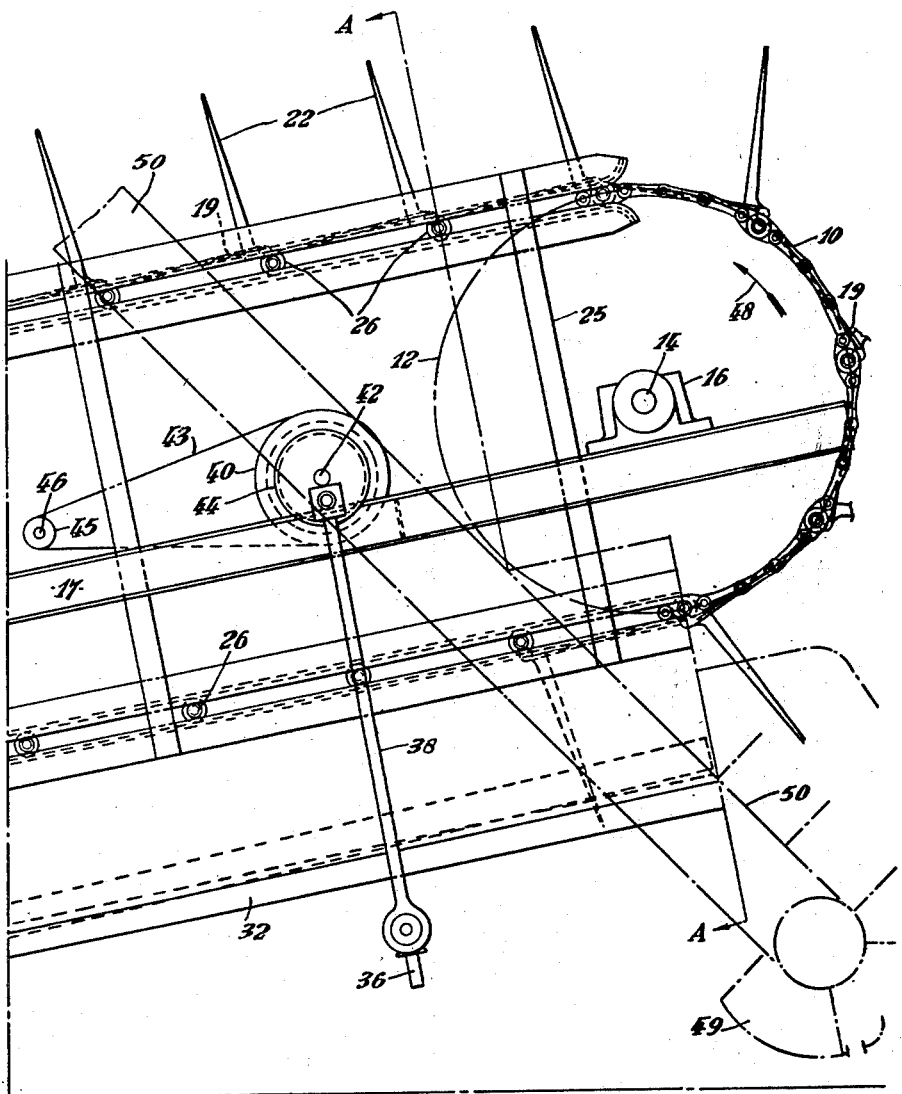

Inventor
Thomas Henry Milbourn
by Albert Jacobs
Attorney

June 24, 1952  T. H. MILBOURN  2,601,412
MACHINE FOR HARVESTING POTATOES AND OTHER ROOT CROPS
Filed July 16, 1949  4 Sheets-Sheet 4
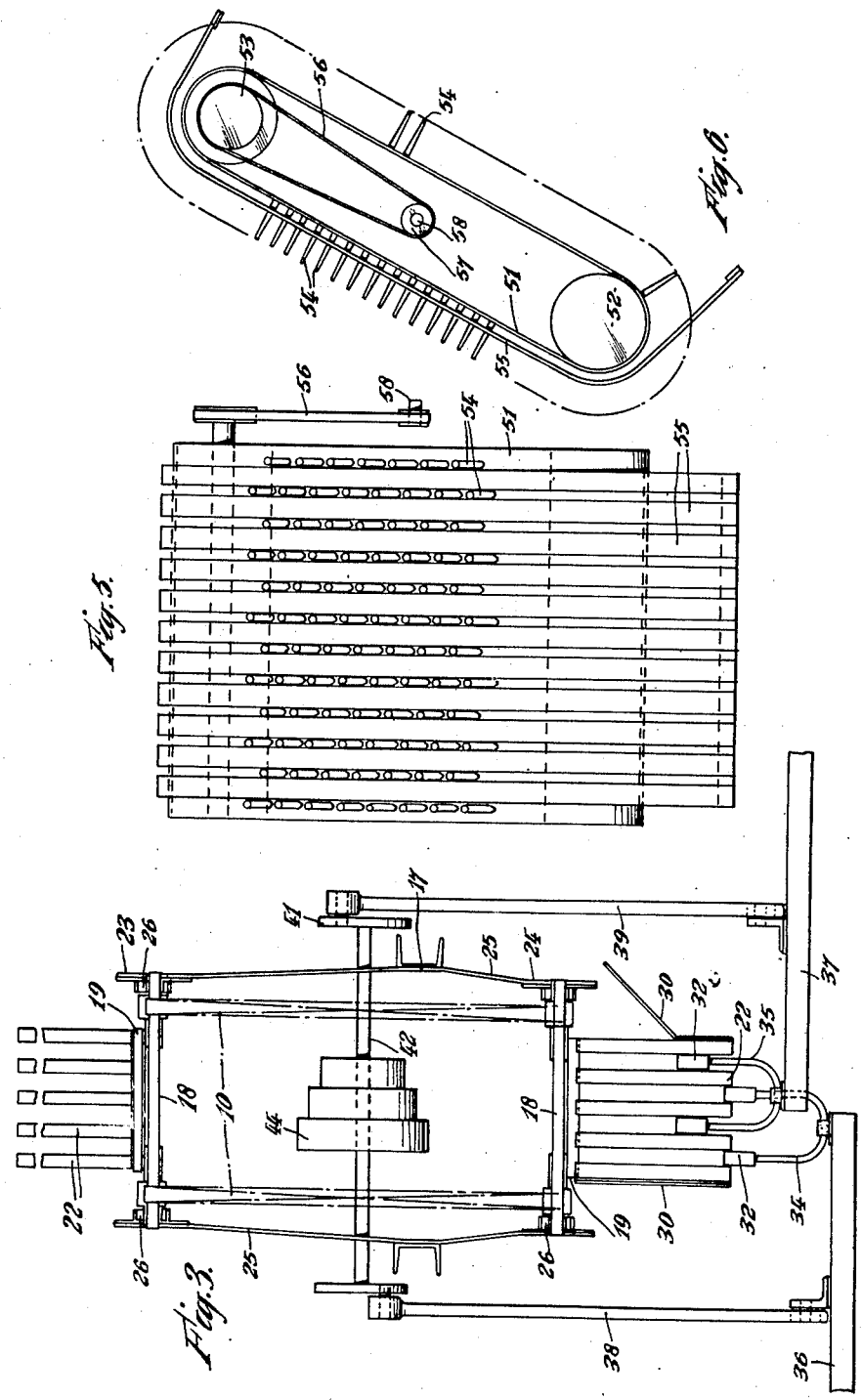

Patented June 24, 1952

2,601,412

UNITED STATES PATENT OFFICE 2,601,412

MACHINE FOR HARVESTING POTATOES AND OTHER ROOT CROPS

Thomas Henry Milbourn, Alston, England

Application July 16, 1949, Serial No. 105,234
In Great Britain June 28, 1948

1 Claim. (Cl. 55—51)

This invention relates to machines for harvesting potatoes and other root crops, and has for its primary object to provide an improved machine capable of lifting a root crop from the soil in which it grows, freeing it from adherent soil and discharging it into a receptacle. Other objects of the invention are to provide means adapted to shear through the base of an earth ridge, means adapted to pass through the upper portion of said ridge to engage a root crop growing therein and remove it from the ridge, means adapted to receive and shake the removed root crop, and means for discharging it into a receptacle. A further object of the invention is to provide means for separately discharging the root crop and its detached stalks and leaves.

With the above and other objects in view, the invention consists in the novel features of construction, arrangement and combination of parts hereinafter more fully described and as set out in the claim hereto appended.

In the accompanying drawings:

Figure 3 is a section on the line A—A in Fig. 1.

Figure 5 is a plan view of the separator, and Figure 6 is a side elevation.

Figure 1:
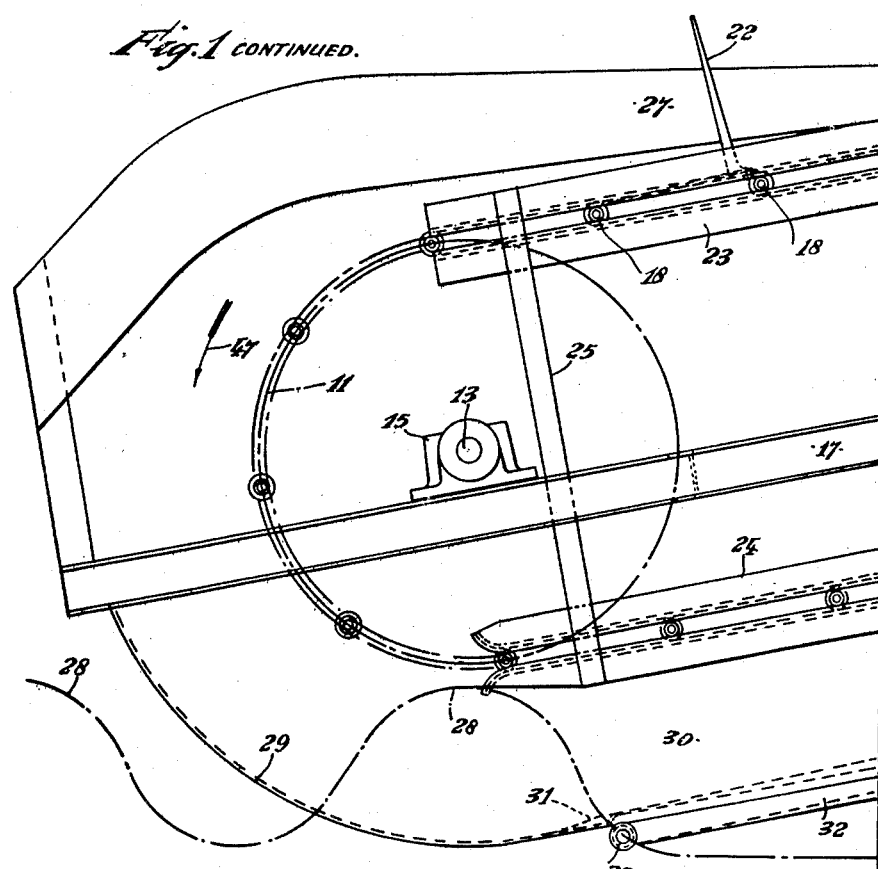
Figure 1 is an elevation looking on the rear end of a potato harvesting machine embodying my invention.

The machine shown in the drawings by way of example comprises a pair of endless chains 10 passing over sprocket wheels 11, 12 mounted on shafts 13, 14 carried by bearings 15, 16 on a pair of inclined girders 17 forming part of a wheeled carriage of any suitable or known type capable of being coupled to a tractor. The shaft of the higher sprocket wheels 12 is power driven. The chains 10 travel transversely of the direction in which the carriage is drawn or propelled, the upper run moving from right to left of Fig. 1. The chains carry crossbars 18 which extend between them and are spaced at regular intervals. The crossbars support plates 19, the leading end of each plate being looped at 20 around a crossbar and bushings 21 on its trailing end engaging the succeeding crossbar so that the plates form an articulated endless band. Prongs 22 are secured in spaced alignment across the trailing ends of the plates. In Fig. 1, the prongs adjacent to the sprocket wheels 12 are indicated, and it will be understood that the prongs are provided over the whole length of the articulated band. Guide bars 23, 24 carried by supports 25 on the girders 17 are provided to engage renewable rollers 26 on the ends of the crossbars 18 and prevent sagging of the chains and articulated endless band. The shafts 13, 14 are disposed so that the lower operative run of the chain from left to right is upwardly inclined. Tapered knives 27 carried by the girders 17 are mounted above the sprocket wheels 11 and spaced to enter between the upper run of the prongs 22 to dislodge and clear the latter of any stones or the like which may have become wedged between them.

The potato-containing ridges of a field are indicated at 28 in Fig. 1 and a spade 29 in the form of a concave plate rigidly secured to the lower end of the girders 17 is disposed so as to shear through the base of an earth ridge as the machine travels forwardly, the forward and trailing edges of said spade merging into sheet metal border plates 30 between which the lower run of the prongs 22 travels. V-shaped guides 31 are rigidly attached, for example by welding, their under surface to the upper surface of the spade to guide the prongs so that they enter between parallel bars 32 forming an inclined shaking grating. The bars 32 are journalled on a cross shaft 33 carried by the wheeled carriage and extend to the righthand end of the machine. They are oscillated between the prongs in sets, the bars of the sets being respectively coupled by forked brackets 34, 35 to the adjacent ends of elongated operating members 36, 37. The members 36, 37 are respectively coupled by links 38, 39 to crank pins on discs 40, 41 on a shaft 42 revolved by a belt 43 passed over a three-speed pulley 44 on said shaft and a pulley 45 on the power driven shaft 46. It will be seen that the sets of bars 32 are alternately oscillated, the throw of the links 38, 39 being such that the oscillation of said bars is within the length of the prongs 22 and they never disengage the latter.

Figure 2:
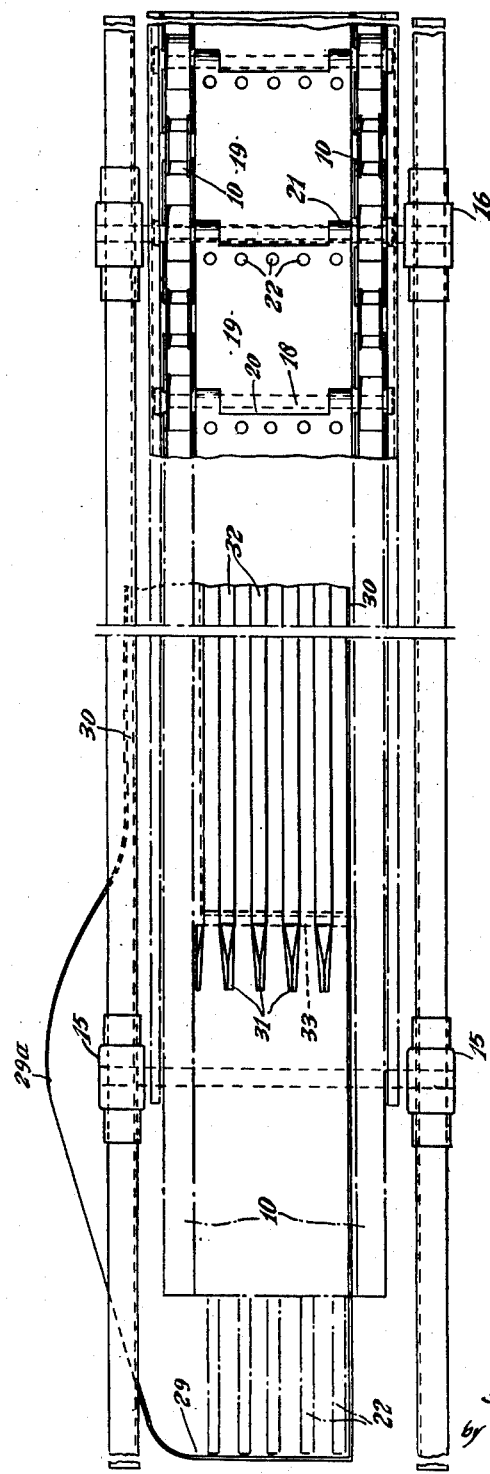
Figure 2 is a partial plan view of Fig. 1.

In use, the machine is drawn forwards over a potato field in a direction parallel to its ridges and furrows so that the forward edge 29a (Fig. 2) of the spade shears through the base of a potato-containing ridge 28 as the machine proceeds; the prongs 22 then travel as indicated by the arrows 47—48, and the prongs travelling downwards over the lower sprocket wheels 11 pass through the ridge 28 over the spade 29 and, as they commence to travel to the right, their points enter between the bars 32 of the shaking grating which is bordered by the relatively stationary plates 30. As they pass through the ridge, the prongs engage the roots therein and carry them with their attached potatoes and adhering soil onto the inclined grating. The shaking of the latter removes the soil from the roots, the potatoes also being detached from their stalks and leaves.

Figure 4:
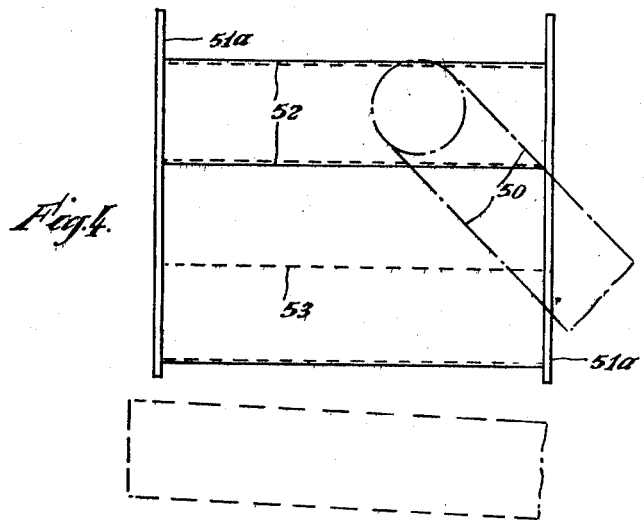
Figure 4 is a rear elevation of the means for separating potatoes from stalks and leaves at the upper end of the uprising conveyor of the machine.

The operative lower run of prongs discharges the mixture of potatoes, stalks and leaves into a hopper 49 at the right-hand end of the machine in which is disposed the lower end of an uprising conveyor 50 of standard type arranged on the wheeled carriage behind the articulated band. The conveyor 50 delivers said mixture to means for separating the potatoes from the stalks and leaves. The separating device employed is illustrated in Figs. 4, 5 and 6 and comprises an endless flexible band 51 disposed between stationary side plates 51ᵃ and passing over rollers 52, 53 and provided with spaced flexible fingers 54 perpendicular to its outer surface and operating in combination with spaced stationary bars 55 running lengthwise of the operative upper run of the band. The rollers 52, 53 are arranged so that said upper run is inclined upwards in the direction in which it travels, and the bars 55 are adjustable in relation to said upper run to vary the projection of the fingers 54 from said bars. The uprising conveyor 50 is arranged to deliver the mixture of potatoes, stalks and leaves onto the upper run of the band 51 at about its centre, or at a point on the lower side thereof. The band is travelled by a belt 56 from a pulley 57 on a power driven shaft 58 about which the separating device can pivot to vary the angle of its band, and the fingers 54 pick up and convey the stalks and leaves to the higher lefthand end of the band where they are discharged while the potatoes, because of their weight, cause the leftward travelling flexible fingers to yield and allow them to roll down the band and be discharged from its lower end into a suitable receptacle.

The sprocket wheels 12, the shaft 42, the uprising conveyor 50 and the finger-carrying band 51 may be simultaneously driven by the land wheels of the carriage on which the machine is mounted, or, as described, they may be power driven, and it will be understood that suitable adjusting devices may be introduced into the machine, where required.

What I claim and desire to secure by Letters Patent is:

In a machine for harvesting root crops having a frame, a grating carried by the frame and driven endless means for moving the crop over the grating; upper and lower pairs of closely spaced-apart guide bars on said frame, said endless means having rotary sprocket wheels mounted on said frame, laterally spaced apart chains trained over said sprocket wheels, regularly spaced cross-bars carried by and spanning said chains, rollers on said cross-bars movable in the spaces between the guide bars of the pairs, plates disposed between successive pairs of cross-bars and supported thereby, each plate at each end being looped about adjacent cross-bars to form an articulated endless band, and prong means carried by said plates to engage and move the crop over the grating, the disposition of the rollers in the said spaces serving to prevent sagging of the plates to enhance the movement of the crop over the grating.

THOMAS HENRY MILBOURN.

REFERENCES CITED

The following references are of record in the file of this patent:

UNITED STATES PATENTS

| Number | Name | Date |
| --- | --- | --- |
| 1,715,218 | Wright et al. | May 28, 1929 |
| 1,837,753 | Berry | Dec. 22, 1931 |
| 1,853,959 | Cuddigan | Apr. 12, 1932 |
| 2,214,174 | Nilson | Sept. 10, 1940 |
| 2,470,211 | Bozeman et al. | May 17, 1949 |
| 2,494,946 | Ingram | Jan. 17, 1950 |